Patented Feb. 6, 1940

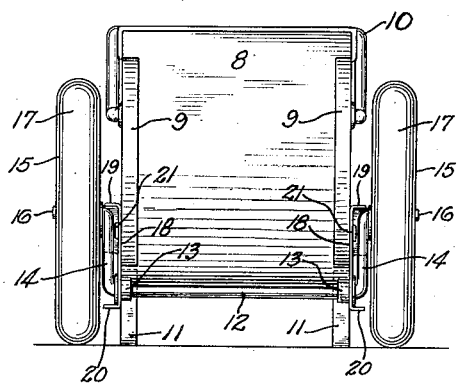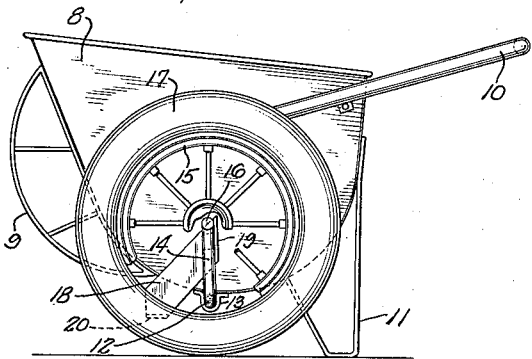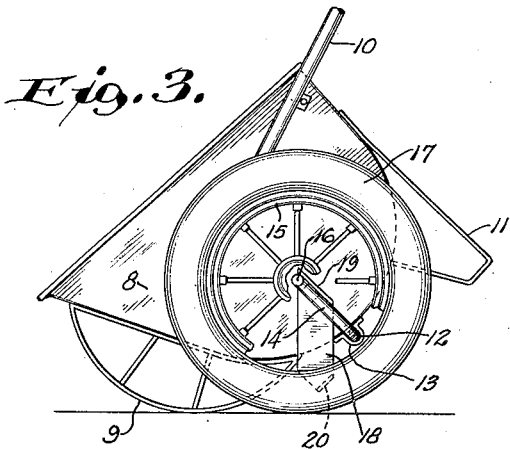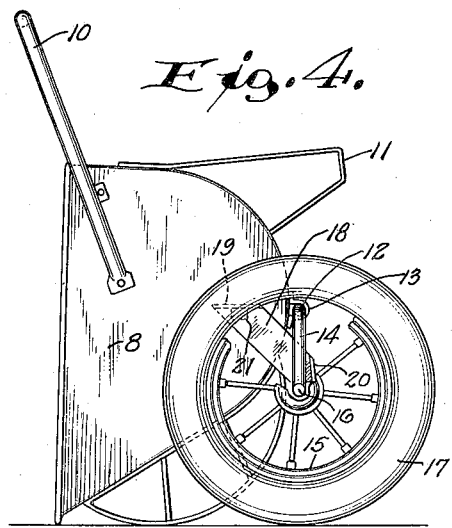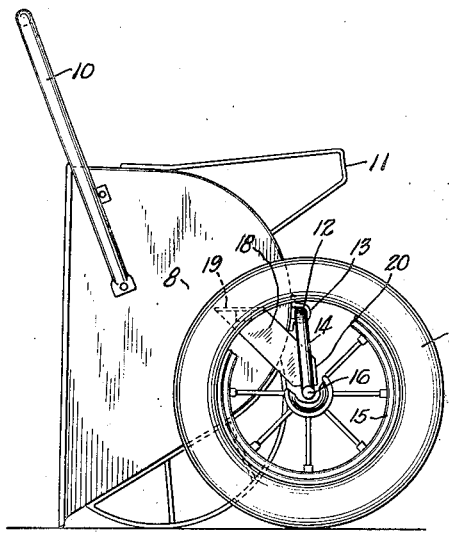

2,189,079

UNITED STATES PATENT OFFICE 2,189,079

CART

Wesley J. Mueller, West Allis, and Irving R. Smith, Milwaukee, Wis., assignors to Sterling Wheelbarrow Company, Milwaukee, Wis., a corporation of Wisconsin Application January 27, 1939, Serial No. 253,088

9 Claims. (Cl. 298—2)

This invention relates to improvements in carts.

Heretofore, the majority of carts for handling concrete or the like have been of a relatively small standard size, such as six cubic feet capacity, because carts of large size have been found difficult to handle and have generally required more than one man for dumping. The small carts are objectionable because they only accommodate about one half of the discharge of a standard concrete mixer. Attempts have been made to build larger carts by utilizing oversize wheels with a resulting higher pivot point for the body, but the handling of this type of cart has been difficult. Other dump carts have been constructed wherein it has been necessary to pivot the cart on its nose, in order to effect complete dumping and to raise the wheels off of the ground during such dumping, and the added weight of the wheels has rendered such handling difficult and tiresome.

Furthermore with the majority of carts of this type the workman has been compelled to hold the heavy cart in dumping position until the contents is entirely discharged. The use of oversize wheels in an attempt to provide carts of larger capacity is objectionable because standard size rubber tires, such as those available for standard automobiles cannot be employed, and the furnishing of such carts with rubber tires of special size has raised the cost to an excessive amount.

It is one of the objects of the present invention to provide a cart having small size wheels, and easily operable by one man, which cart can be furnished in a size to accommodate the entire discharge of a standard concrete mixer, the said cart being furthermore tiltable to complete dumping position without lifting the wheels off of the ground.

A further object of the invention is to provide a cart as above described which is so constructed that the cart will hold itself in maximum tilted position to thereby relieve the operator from supporting the load during dumping, and to further permit storage of empty carts in such a position that rain water will not collect in the body.

A further object of the invention is to provide a cart as above described, which, when in dumping position, may be optionally held by the workman in such position or locked to maintain itself at substantially right angles to normal.

A more specific object of the invention is to provide a cart as above described having an underslung axle, the wheels being rotatable on crank shaped ends of said axle, and the axle being rotatable in bearings on the bottom of the cart whereby during dumping the cart will first tilt on the wheel axis until a portion strikes the ground and will then tilt while in contact with the ground while the crank shaped axle parts move through an arc of substantially ninety degrees to keep the wheels on the ground during such further tilting movement.

A further specific object of the invention is to provide a cart as above described, including rockers for facilitating dumping movement after said rockers have engaged the ground, and including stops cooperable with the crank shaped parts of the axle, said stops rendering the double pivot effective to provide for complete dumping of a cart of relatively large size supported upon relatively small wheels without lifting said wheels off of the ground.

Other objects of the invention are to provide a cart which is simple and inexpensive in construction, neat in appearance, strong and durable, and well adapted for the purpose described.

With the above and other objects in view, the invention consists of the improved cart and all its parts and combinations as set forth in the claims and all equivalents thereof.

In the accompanying drawing illustrating one complete embodiment of the preferred form of the invention in which the same reference numerals designate the same parts in all of the views:

Fig. 1 is a front view of the cart with the body in normal position;

Fig. 2 is a side view thereof, part of one of the wheels being broken away;

Fig. 3 is a side view illustrating the first part of dumping movement;

Fig. 4 is a side view showing the cart in complete dumping position; and

Fig. 5 is a side view showing the cart locked in complete dumping position.

Referring more particularly to the drawing, the numeral 8 designates the body portion forming a receptacle for concrete or other material. Said body is preferably formed of sheet metal and is provided with spaced rockers 9 on the front thereof, with a handle 10 projecting from the rear and with legs 11 for supporting the body in normal upright position.

An underslung axle 12 extends transversely beneath the bottom of the body 8 as shown in Fig. 1 and is rotatable in bearings 13 depending from said body. The ends 14 of said axle are generally crank shaped, and when the body is in normal upright position, embrace the sides thereof. Wheels 15 are rotatable on the extreme ends 16 of the crank shaped portions, and said wheels are of relatively small size so that they may be equipped with inexpensive standard pneumatic rubber tires 17.

Welded or otherwise secured to the opposite sides of the body 8 are plates 18. One end of each plate is flanged outwardly as at 19 to form a projection engageable with the crank shaped portions 14 of the axle in the manner shown in Figs. 2 and 3. The other end of each plate 18 projects below the body and is flanged outwardly as at 20 to provide a stop. Metal pads 21 may project from the outer faces of the plates 18 in a position to engage the crank shaped portions 14 if the cart is so overloaded as to cause lateral bulging of the sides. These pads would necessarily limit the amount of such bulging possible and prevent binding of a large area of said sides against the crank shaped portions of the axle in case of overload.

In use of the cart, it is normally filled at the mixer while in the upright position of Fig. 2, the body being so balanced as to maintain itself in the upright position of Fig. 2, resting upon the rear legs 11. The cart is then wheeled to a point of dumping and the workman then lifts upwardly on the handle 10 to tilt the cart to the position of Fig. 3 until the rockers 9 strike the ground. Such tilting movement is on the axis of the wheels because the projections 19 are in engagement with the crank shaped portions 14 of the axle during movement of the body from the position of Fig. 2 to the position of Fig. 3. Thus during the first part of the tilting movement there is no rotation of the crank shaped parts 14 with respect to the body.

After the rockers have engaged the ground, the operator pushes the body from the position of Fig. 3 to the position of Fig. 4, and during such movement the axle 12 is raised to such a position that the wheels would normally have to be elevated and lifted off of the ground with the body. With the present construction, however, the wheels remain by gravity on the ground, and the crank shaped portions 14 swing through an arc of approximately ninety degrees with respect to the body and in the bearings 13. In the complete dumping position of Fig. 4, therefore, the axle portion 12 is disposed directly above the axis of the wheels. It is to be noted that the crank shaped parts 14 are of such length as to permit the wheels to remain on the ground when the body is in the position of Fig. 4.

After the contents are discharged from the body while in the position of Fig. 4, the operator may immediately tilt the body back to normal position. However, if he desires to scrape material out of the cart or leave it in dumping position, the crank shaped parts 14 are urged from the position of Fig. 4 to the position of Fig. 5, which is past dead center, and the body will then maintain itself in the position of Fig. 5. The stops 20 limit further movement of the crank shaped parts 14 from the position of Fig. 5 and are so spaced from the body as to permit movement of the crank shaped parts to the position of Fig. 5. The cart position of Fig. 5 is particularly desirable when the cart is being stored, because the body is maintained in such a position that water will not collect therein to cause rust or other deterioration.

From the above it is apparent that due to the use of the double pivot, a large size body may be supported on relatively small standard size wheels which can be equipped with standard pneumatic rubber tires. It is also apparent that the cart can be tilted to complete dumping position without lifting the added weight of the wheels, making it possible for one man to handle a cart of large capacity. It is also apparent that the cart will automatically maintain itself in a position at right angles to normal, whereby there is no need for the operator to support the load during dumping and whereby the cart may be stored in a desirable position when not in use.

Various changes and modifications may be made by those skilled in the art, and all of such changes are contemplated as may come within the scope of the claims.

We claim:

1. In a cart, a body portion forming a receptacle, wheel supporting means, a wheel rotatably mounted on each side of said supporting means with the body therebetween, means for pivotally connecting said wheel supporting means to said body intermediate the length of said body, the axis of said pivotal connection being below the axis of said wheels when the body is upright, and a projection on the body engageable with the wheel supporting means when the body is tilted in a forward direction for causing the wheel supporting means to move with the body on the wheel axis until a portion of the body strikes the ground, the body being further tiltable while in contact with the ground, and the distance between the wheel axis and the axis of the pivotal connection between the body and the wheel supporting means being such as to permit the wheels to remain by gravity on the ground during such further tilting of the body to a position at substantially right angles to normal.

2. In a cart, a body portion forming a receptacle and having rockers on the front portion thereof, wheel supporting means, a wheel rotatably mounted on each side of said supporting means with the body therebetween, means for pivotally connecting said wheel supporting means to said body intermediate the length of said body, the axis of said pivotal connection being below the axis of said wheels when the body is upright, and a projection on the body engageable with the wheel supporting means when the body is tilted in a forward direction for causing the wheel supporting means to move with the body on the wheel axis until the rockers strike the ground, the body being further tiltable on said rockers, and the distance between the wheel axis and the axis of the pivotal connection between the body and wheel supporting means being such as to permit the wheels to remain by gravity on the ground during such further tilting of the body to a position at substantially right angles to normal.

3. In a cart, a body portion forming a receptacle, wheel supporting means, a wheel rotatably mounted on each side of said supporting means with the body therebetween, means for pivotally connecting said wheel supporting means to said body intermediate the length of said body, the axis of said pivotal connection being below the axis of said wheels when the body is upright, a projection on the body engageable with the wheel supporting means when the body is tilted in a forward direction for causing the wheel supporting means to move with the body on the wheel axis until a portion of the body strikes the ground, the body being further tiltable while in contact with the ground and the distance between the wheel axis and the axis of the pivotal connection between the body and the wheel supporting means being such as to permit the wheels to remain by gravity on the ground during such further tilting of the body to a position at substantially right angles to normal, and a stop for limiting pivotal movement of the wheel supporting means with respect to the body after the body has reached dumping position.

4. In a cart, a body portion forming a receptacle, an axle extending transversely of said body beneath an intermediate portion of the bottom thereof and having crank shaped ends normally embracing the sides of said body, a wheel rotatable on each of said crank shaped ends, means for pivotally connecting the body to the transversely extending portion of said axle whereby the axis of said connection is below the axis of the wheels when the body is upright, and a projection on said body engageable with a crank shaped end of the axle when the body is being tilted in a forward direction for causing the crank shaped ends of the axle to maintain their normal relationship with respect to the body until a portion of the body strikes the ground, the body being further tiltable while in contact with the ground while the crank shaped ends of the axle move through an arc of substantially ninety degrees, the length of said crank shaped ends being sufficient to permit the wheels to remain on the ground during such movement of the crank shaped ends and during such further tilting of the body.

5. In a cart, a body portion forming a receptacle, an axle extending transversely of said body beneath an intermediate portion of the bottom thereof and having crank shaped ends normally embracing the sides of said body, a wheel rotatable on each of said crank shaped ends, means for pivotally connecting the body to the transversely extending portion of said axle whereby the axis of said connection is below the axis of the wheels when the body is upright, a projection on said body engageable with a crank shaped end of the axle when the body is being tilted in a forward direction for causing the crank shaped ends of the axle to maintain their normal relationship with respect to the body until a portion of the body strikes the ground, the body being further tiltable while in contact with the ground while the crank shaped ends of the axle move through an arc of substantially ninety degrees, the length of said crank shaped ends being sufficient to permit the wheels to remain on the ground during such movement of the crank shaped ends and during such further tilting of the body, and a stop carried by the body and engaged by the crank shaped end of the axle for limiting said last mentioned movement of the crank shaped ends with respect to the body.

6. In a cart, a body portion forming a receptacle, an axle extending transversely of said body beneath an intermediate portion of the bottom thereof and having crank shaped ends normally embracing the sides of said body, a wheel rotatable on each of said crank shaped ends, means for pivotally connecting the body to the transversely extending portion of said axle whereby the axis of said connection is below the axis of the wheels when the body is upright, a projection on said body engageable with a crank shaped end of the axle when the body is being titlted in a forward direction for causing the crank shaped ends of the axle to maintain their normal relationship with respect to the body until a portion of the body strikes the ground, the body being further tiltable while in contact with the ground while the crank shaped ends of the axle move through an arc of substantially ninety degrees, the length of said crank shaped ends being sufficient to permit the wheels to remain on the ground during such movement of the crank shaped ends and during such further tilting of the body, and a stop carried by the body and engaged by the crank shaped end of the axle for limiting said last mentioned movement of the crank shaped ends with respect to the body, said stop being so located that the crank may be moved past dead center to maintain the body in dumping position.

7. In a cart, a body portion forming a receptacle and having rockers on the front portion thereof, an axle extending transversely of said body beneath an intermediate portion of the bottom thereof and having crank shaped ends normally embracing the sides of said body, a wheel rotatable on each of said crank shaped ends, means for pivotally connecting the body to the transversely extending portion of said axle whereby the axis of said connection is below the axis of the wheels when the body is upright, and a projection on said body engageable with a crank shaped end of the axle when the body is being tilted in a forward direction for causing the crank shaped ends of the axle to maintain their normal relationship with respect to the body until the rockers strike the ground, the body being further tiltable on said rockers while the crank shaped ends of the axle move through an arc of substantially ninety degrees, the length of said crank shaped ends being sufficient to permit the wheels to remain on the ground during such movement of the crank shaped ends and during such further tilting of the body.

8. In a cart, a body portion forming a receptacle and having rockers on the front portion thereof, an axle extending transversely of said body beneath an intermediate portion of the bottom thereof and having crank shaped ends normally embracing the sides of said body, a wheel rotatable on each of said crank shaped ends, means for pivotally connecting the body to the transversely extending portion of said axle whereby the axis of said connection is below the axis of the wheels when the body is upright, a projection on said body engageable with a crank shaped end of the axle when the body is being tilted in a forward direction for causing the crank shaped ends of the axle to maintain their normal relationship with respect to the body until the rockers strike the ground, the body being further tiltable on said rockers while the crank shaped ends of the axle move through an arc of substantially ninety degrees, the length of said crank shaped ends being sufficient to permit the wheels to remain on the ground during such movement of the crank shaped ends and during such further tilting of the body, and a stop carried by the body and engaged by the crank shaped end of the axle for limiting said last mentioned movement of the crank shaped ends with respect to the body.

9. In a cart, a body portion forming a receptacle, wheel supporting means, a wheel rotatably mounted on each side of said supporting means with the body therebetween, means for pivotally connecting said wheel supporting means to said body intermediate the length of said body, the axis of said pivotal connection being below the axis of said wheels when the body is upright, and means causing engagement between the body and the wheel supporting means when the body is tilted in a forward direction for causing the wheel supporting means to move with the body on the wheel axis until a portion of the body strikes the ground, the body being further tiltable while in contact with the ground, and the distance between the wheel axis and the axis of the pivotal connection between the body and the wheel supporting means being such as to permit the wheels to remain by gravity on the ground during such further tilting of the body to a position at substantially right angles to normal.

WESLEY J. MUELLER.
IRVING R. SMITH.